United States Patent
Holley, Jr.

(10) Patent No.: US 9,610,869 B1
(45) Date of Patent: Apr. 4, 2017

(54) PLUSH BACKREST COVER WITH TUBE-LIKE ARMS FOR COMBINATION SAFETY/BOOSTER SEAT ASSEMBLY

(71) Applicant: Sentry Baby Products, LLC, Colorado Springs, CO (US)

(72) Inventor: James W. Holley, Jr., Colorado Springs, CO (US)

(73) Assignee: Sentry Baby Products, LLC, Colorado Springs, CO (US)

( * ) Notice: Subject to any disclaimer, the term of this patent is extended or adjusted under 35 U.S.C. 154(b) by 0 days.

(21) Appl. No.: 15/064,136

(22) Filed: Mar. 8, 2016

(51) Int. Cl.
*A47C 31/10* (2006.01)
*B60N 2/26* (2006.01)
*B60N 2/28* (2006.01)

(52) U.S. Cl.
CPC ........... *B60N 2/2881* (2013.01); *B60N 2/286* (2013.01); *B60N 2/2851* (2013.01); *B60N 2/2878* (2013.01)

(58) Field of Classification Search
CPC .... B60N 2/2851; B60N 2/286; B60N 2/2878; B60N 2/2881
USPC ........ 297/118, 181, 219.12, 227, 228, 250.1, 297/354.12, 354.13
See application file for complete search history.

(56) References Cited

U.S. PATENT DOCUMENTS

| | | | | |
|---|---|---|---|---|
| 2,254,466 A | * | 9/1941 | Albert | A47D 1/008 297/228 X |
| 4,695,092 A | * | 9/1987 | Hittie | B60N 2/60 297/181 |
| 4,909,573 A | * | 3/1990 | Barry | A47D 15/006 297/181 |
| 5,137,335 A | * | 8/1992 | Marten | B60N 2/2881 297/181 |
| 5,941,599 A | * | 8/1999 | Roberts | A47C 3/16 297/181 X |
| 6,126,240 A | * | 10/2000 | Tse | A47D 1/00 297/181 |
| 7,364,235 B2 | * | 4/2008 | Chen | A47D 1/002 297/354.13 X |
| 7,625,043 B2 | * | 12/2009 | Hartenstine | B60N 2/2806 297/250.1 |
| 7,854,476 B1 | * | 12/2010 | Liu | A47D 1/103 297/181 |
| 9,210,957 B2 | * | 12/2015 | Conde | A41D 1/00 |

(Continued)

*Primary Examiner* — Rodney B White
(74) *Attorney, Agent, or Firm* — Bever, Hoffman & Harms, LLP

(57) ABSTRACT

A combination safety/booster seat assembly includes a back/head support attached to a base by engaging hooks that are insertable into associated sockets when the back/head support is fully reclined, and become secured in the sockets when the back/head support is subsequently rotated upright. A plush cover depicting a friendly animal character (e.g., bear) is mounted over the back/head support and includes tube-like armrest covers with inward-facing paws. The base includes rigidly connected armrests and is covered by a generic seat cover. The seat assembly provides a character-based safety/booster seat with the armrest covers mounted over the armrests such that backward rotation of the back/head support is resisted, thereby securing the back/head support to the base. When the child is older, the armrest covers are detached from the armrests to allow rotation/detachment of the back/head structure from the base, thereby providing a generic (i.e., character-free) no-back booster.

3 Claims, 8 Drawing Sheets

(56) References Cited

U.S. PATENT DOCUMENTS

| | | | |
|---|---|---|---|
| 9,365,136 B2* | 6/2016 | Strmiska | B60N 2/2881 |
| 2003/0151282 A1* | 8/2003 | Williams | B60N 2/2851 |
| | | | 297/250.1 |
| 2007/0170759 A1* | 7/2007 | Nolan | B60N 2/2851 |
| | | | 297/250.1 |
| 2009/0152918 A1* | 6/2009 | Yumoto | B60N 2/2866 |
| | | | 297/219.12 |
| 2009/0322131 A1* | 12/2009 | Hartenstine | B60N 2/2821 |
| | | | 297/250.1 X |
| 2012/0292963 A1 | 11/2012 | Sedlack | |

* cited by examiner

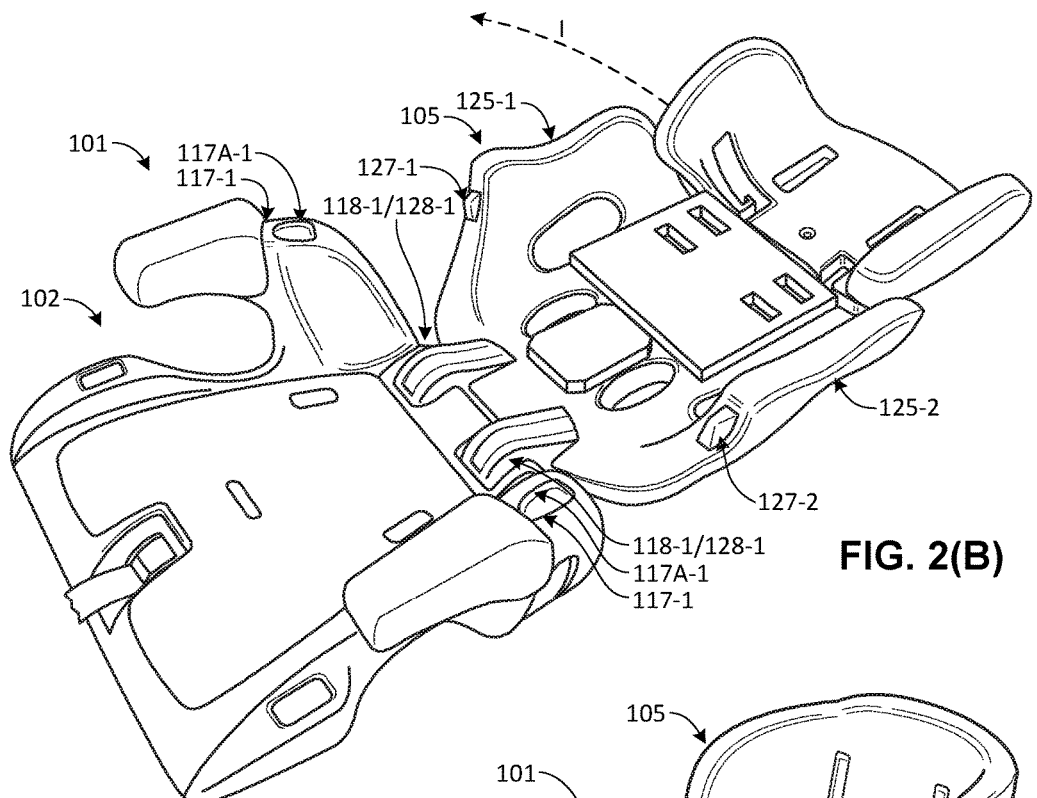
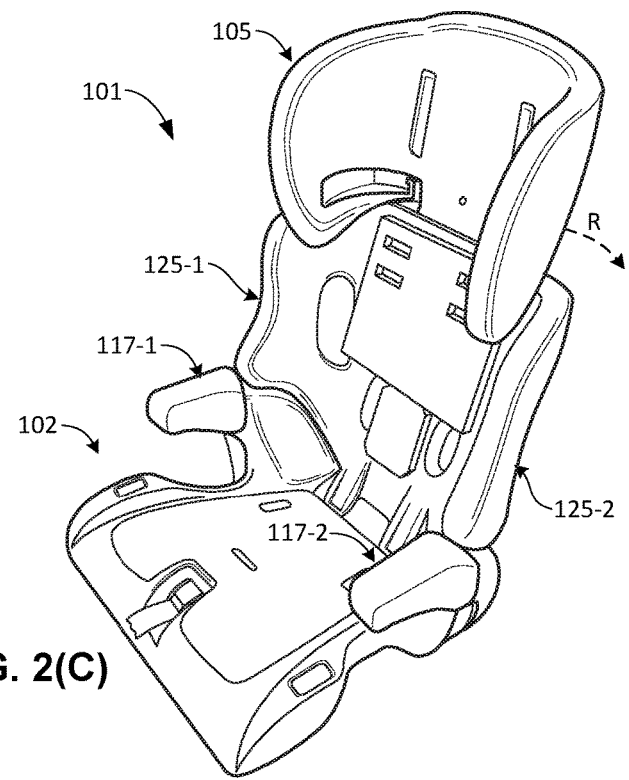
FIG. 2(B)
FIG. 2(C)

PLUSH BACKREST COVER WITH TUBE-LIKE ARMS FOR COMBINATION SAFETY/BOOSTER SEAT ASSEMBLY

FIELD OF THE INVENTION

The present invention relates generally to child safety and restraint devices. More specifically, the present invention relates to front-facing convertible/booster-type child safety seats that are typically utilized for children of ages 3 and up.

BACKGROUND OF THE INVENTION

Many regions require children defined by age, weight, and/or height to use a specific government-approved child safety seat, which mount on existing automobile seats, and are utilized to secure children during automobile travel. Generally, most regions require the use of safety seats for younger children that are secured to the car by way of existing seat belts or another system, and include separate five-point harnesses that secure the younger child to the safety seat. Typically, such safety seats include rear-facing infant seats for newborn babies and children up to approximately 2 years or 20 pounds, and front-facing child safety seats from age 2 to approximately age 4 or 40 lbs. Most regions also require the use of a booster-type safety seat for children between ages 5 and 10 or 40 to 100 lbs that allow the use of an automobile's existing lap/shoulder seat belt system to secure a child, but serve to elevate the child so the shoulder belt rests appropriately on the shoulder blade and does not ride up the child's neck, and raises the child's hips so that the lap belt rests securely across and remain on the large bones instead of resting across the soft tissue of the abdomen. Booster seats include high-back, belt-positioning booster seats, low-back booster seats and no-back booster seats. High-back, belt-positioning booster seats, which are often required for younger/smaller children, and include both a base (seat) that provides the required child elevation, and a back portion that is secured to the base and includes slots or grooves along the side edges to properly position the shoulder belt, and often includes head support structures and padding hat provide improved protection in side-impact collisions. When a child has grown such that the booster's shoulder belt position feature is no longer needed (e.g., ages 5 or 6 and up), a low-back or no-back booster seat can be used.

Combination safety/booster seats are configured to serve both as child safety seats and booster-type seats by way of providing both a five-point harness system and belt-positioning structures, thereby facilitating conversion from a front-facing child safety seat to booster seat by way of removing the seat's five-point harness system. By providing a compliant safety seat platform for both younger and older children, combination safety/booster seats, provide an economical choice for parents wishing to avoid to expense of purchasing separate child safety and booster seats as their child grows.

Currently there are two general classes of combination safety/booster seats: 2-in-1-type combination seats and 3-in-1-type combination seats. Both 2-in-1-type and 3-in-1-type safety/booster combination seats includes both structures for supporting the five-point harness system and belt-positioning structures that facilitate conversion to a booster seat, e.g., when a child reaches 40 lbs. However, 2-in-1-type combination seats typically comprise a single-piece shell (e.g., an integral molded structure or permanently connected assembly including both back and base portions) that limits the conversion process from the child safety seat configuration to a high-back belt-positioning booster seat configuration. In contrast, 3-in-1-type combination seats include a two-piece seat assembly (i.e., detachable back and base structures) that facilitates conversion from the child safety seat configuration to the high-back belt-positioning booster seat configuration, and facilitates further configuration from the high-back belt-positioning booster seat to a low-back/no-back booster seat configuration by way of removing the back structure from the base structure, e.g., when a child reaches a suitable age and size.

Although both 2-in-1-type and 3-in-1-type combination seats provide cost advantages over separate child safety and booster seats, 3-in-1-type seats combination arguably have cost and/or safety advantages over 2-in-1-type combination seats. That is, a problem with 2-in-1-type combination seats is that, in order to properly support and protect children up to 100 lbs, the integral back and base portions must be substantially larger than those otherwise required for children transitioning from infant to child safety seats, which increases material costs. Moreover, various adjustment mechanisms must be provided for parents to properly secure their smaller child in the larger seat frame, further increasing manufacturing costs and potentially decreasing child safety by way of improper adjustment. In contrast, because 3-in-1-type combination seats convert to low-back/no-back booster seats by way of detaching the back structure from the base structure, the overall size of 3-in-1-type combination seats can be made smaller than that of 2-in-1-type combination seats, both reducing manufacturing costs and arguably increasing the safety of smaller children. That is, the child grows too large for the smaller seat back structure, then the child is ready to transition to a low-back/no-back booster, and the seat back structure is simply removed.

Various attachment mechanisms have been developed for detachably securing the back structure to the base structure in conventional 3-in-1-type combination seats. U.S. Published Application 2012/0292963 entitled "Seat Adjustment Mechanism" teaches an arrangement in which the back portion is attached to the base structure by way of L-shaped beams that attach at their lower end to rotatable connectors provided on the base structure, and by way of locks that engage a lock bar provided on the base structure, whereby detachment of back portion from the base structure requires a parent to manipulate tabs while rotating the back portion forward and pulling the back portion upward. While this mechanism provides secure connection of the back portion to the base structure, the mechanism significantly increases manufacturing costs and can be difficult to use. A second "simple hinge" approach involves forming a seat assembly for a 3-in-1-type combination seat in which an integrally molded plastic back structure attaches to an integrally molded plastic base structure by way of a hinge-type connection mechanism formed by corresponding integrally molded plastic structures, for example, integrally molded hook-like engagement structures disposed on a lower edge of the back structure, and corresponding integrally molded socket structures disposed on a back edge of the base structure. In this case, the hook-like engagement structures are able to enter and engage rods disposed in the socket structures when the back structure is oriented in an inclined (leaned-back) position relative to the base structure, and become securely rotatably locked inside the socket structures when the back structure is subsequently rotated upward. Further forward rotation of the back structure (i.e., beyond approximately) 90° is prevented by contact between side flanges of the back structure against the armrest/belt-guide protrusions formed on the base structure. Although this second approach provides a substantially less expensive and more intuitive mechanism, a problem with this arrangement is that the back structure can pivot backward relative to the base structure during installation, which may result in undesirable (or potentially dangerous) disengagement of one or both hook-like engagement structures from their corresponding sockets.

Character-based child safety seats are child safety seats that include integral depictions of popular cartoon characters, and are favored by some parents because the character image is believed to entice young children to willingly enter and remain seated within their safety seat. However, a child's fondness for the depicted character typically tends to wane as a child reaches age 5 or 6, which may cause the child to resist entering the character-based seat. Thus, this issue is particularly acute when character-based images are incorporated into 2-in-1-type and 3-in-1-type combination seats because such seats are intended to last until the child is age 9 or 10, and children of this age may entirely refuse to utilize a booster seat that retains any indicia pertaining to the character.

What is needed is a low-cost 3-in-1-type combination/booster seat assembly that avoids the problems associated with conventional approaches. Specifically, what is needed is a low-cost 3-in-1-type combination safety/booster seat that remains coherent during installation, and facilitates easy conversion from a character-based combination/high-back-booster seat to a generic (non-character) low-back/no-back booster seat.

SUMMARY OF THE INVENTION

The present invention is directed to low-cost 3-in-1-type combination safety/booster seat assembly including a base (base structure), a back/head support that is detachably coupled to the base, and a plush cover that is configured to both provide comfort and safety, and also to resist rotation of the backrest structure in the reclining direction. The base structure includes a seat portion including two belt-guide portions, each having an armrest disposed on an armrest support that is rigidly connected adjacent to a back edge of the seat portion. The back/head support (i.e., separate molded backrest structure and headrest structure, or an integral combination thereof) includes a generally vertical central backrest portion and two flanges respectively extending generally forward from side edges of the central backrest portion. The plush cover including a torso cover portion securely mounted onto the backrest structure (e.g., by way of a strap or other backside connecting structure extending behind the backrest structure), and having tube-like armrest cover sections having closed free ends and attachment openings configured such that the tube-like armrest cover sections respectively mount over armrests disposed on the base when back/head support operably coupled to the base and in a fully upright position. Specifically, bias forces exerted by front edges of the armrests on the closed free ends of the tube-like armrest cover sections is resisted by way of a corresponding tensile force extending from the closed free ends along the tube-like armrest cover sections and flange cover sections to the backside attachment structure, which is braced by the back surface of the back/head support. This arrangement is beneficial in that, by resisting rotation of the back/head support relative to the base in this way, the plush cover prevents undesirable (or potentially dangerous) disengagement of the back/head support from the base during manual installation of the seat assembly (i.e., while the seat assembly is being mounted and secured to an automobile car seat by a parent). In addition, the padded closed free ends of the tube-like armrest cover sections provide optimally placed padding that prevents discomfort or possible injury when a young child is placed into the safety seat assembly, and provides added shock absorption and comfort that enhance child safety once the child is secured in the safety seat assembly.

According to an embodiment of the invention, a low-cost character-based combination safety/booster seat assembly includes a base, a backrest structure detachably connected to the base, a headrest structure adjustably coupled to the backrest structure, and a plush-fabric cover including separate backrest and headrest panels (i.e., integrally sewn fabric pieces) portions that include respective features depicting the torso and head of a child-friendly character (e.g., a friendly bear), and a base cover panel that includes substantially generic features (i.e., formed from the color fabric as the backrest and headrest panels, but devoid of features depicting recognizable parts of the character's lower body and legs). In one embodiment, easily attachable/detachable feet pillows are disposed on the front edge of the base/seat cover panel to depict lower extremities of the character, but these feet pillows are not considered part of the base cover panel. Similar to the first embodiment, the backrest panel includes tube-like armrest cover sections that are attached to and extend from a torso cover portion and include attachment openings configured to mount the tube-like armrest cover sections onto the armrests (i.e., over armrest cover sections of the base cover panel cover sections). In this case, hand or paw (extremity) features are depicted on inward-directed fabric portions adjacent to the free ends of the tube-like armrest cover sections in a manner suggesting that the character wishes to hug the child when the child is sitting in the seat. This arrangement is deemed beneficial because the head and torso cover sections facilitate depicting the head, body, and arms of an attractive character (e.g., a friendly bear) that serves to entice young children to enter and remain seated in the safety seat assembly, thereby making it easier for a parent to comply with existing child safety laws. In addition, as the child grows and is no longer attracted to the depicted character, removal of the backrest structure during conversion of the safety seat or high-back booster seat to a no-back booster seat entirely removes the torso cover and tube-like armrest cover sections (i.e., thereby exposing generically adorned armrests disposed on the base), whereby the seat assembly is entirely free of all indicia related to the character that might cause anxiety or embarrassment.

According to another embodiment of the invention, a low-cost character-based combination safety/booster seat assembly includes the plush cover set forth above in combination with a seat base, backrest and headrest structures that are configured to connect by way of engaging hooks extending from a lower edge of the backrest structure into sockets formed in the base when the seat is in a fully reclined orientation, and then rotating the seat upward into the fully upright position. The engaging hook/socket attachment arrangement facilitates highly intuitive assembly of the backrest/headrest structures to the base structure, and the plush cover serves to prevent reclining rotation of the backrest/headrest structures during installation, thereby preventing detachment during seat installation. The arrangement also benefits from the mentioned characteristic that all references to the character are removed when the seat is converted from a child safety seat or high-back booster seat to a no-back booster seat.

BRIEF DESCRIPTION OF THE DRAWINGS

These and other features, aspects and advantages of the present invention will become better understood with regard to the following description, appended claims, and accompanying drawings, where:

FIGS. 2(A), 2(B) and 2(C) are perspective views showing a backrest structure and a base utilized in the assembly of FIG. 1 in separated-fully-reclined, attached-fully-reclined, and attached-fully-upright configurations, respectively;

DETAILED DESCRIPTION OF THE DRAWINGS

The present invention relates to an improvement in child safety seats. The following description is presented to enable one of ordinary skill in the art to make and use the invention as provided in the context of a particular application and its requirements. As used herein, directional terms such as "upper", "upward", "lower", "downward", "front", "rear", "back", "vertical" and "horizontal", are intended to provide relative positions for purposes of description, and are not intended to designate an absolute frame of reference. In addition, the phrases "integral", "integrally molded" and "integrally sewn" are used herein to describe the connective relationship between two portions of a single molded, sewn/woven or machined structure, and are distinguished from the terms "connected" or "coupled" (without the modifier "integrally"), which indicates two separate structures that are joined by way of, for example, Velcro™ or other fastener, clip, button, zipper, or other manually manipulated connecting mechanism. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1:
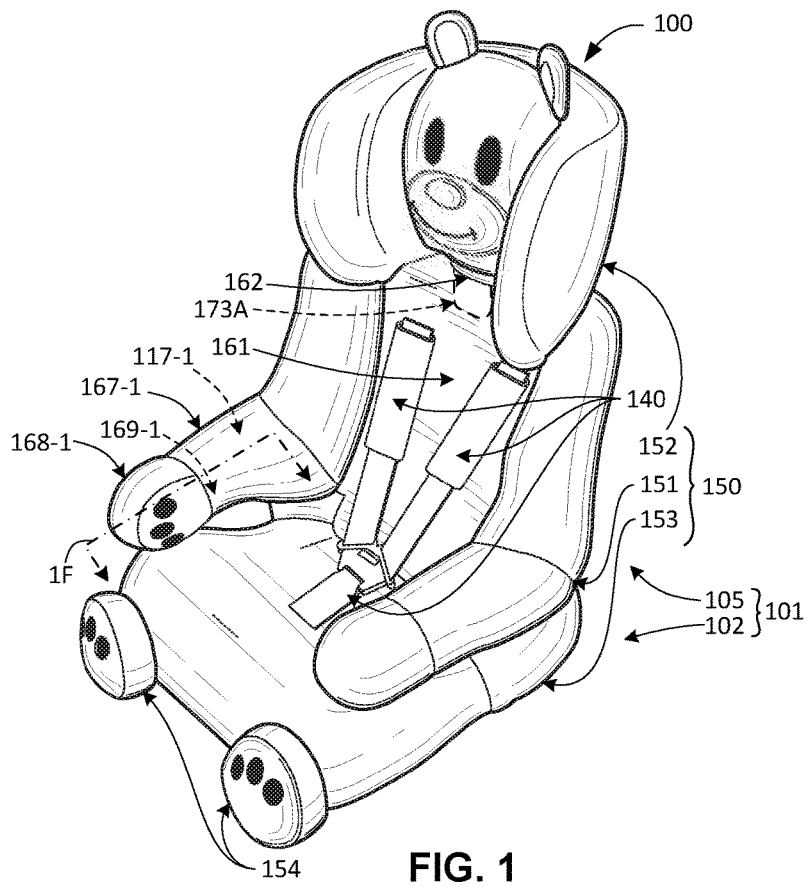
FIGS. 1, 1(A), 1(B), 1(C), 1(D), 1(E) and 1(F) are perspective, front and section views showing a 3-in-1-type combination safety/booster seat assembly in a safety seat configuration and the seat assembly's separated component parts according to an exemplary embodiment of the present invention.

FIG. 1 shows a 3-in-1 combination safety/booster seat 100 according to an exemplary embodiment of the present invention. Seat assembly 100 is shown in a fully-assembled configuration in FIG. 1, and the various component parts that collectively form seat assembly 100 are shown in FIGS. 1(A) to 1(F). As indicated in FIG. 1, seat assembly 100 generally includes a seat shell 101, a plush cover 150 (i.e., a seat cover formed using a plush-fabric or a fabric disposed over a conformal cushion layer, or a combination thereof) that mounts over seat shell 101, and an optional removable safety harness system 140 that is secured by way of belt-guide features formed on seat shell 101 such that it can be removed when seat assembly 100 is converted from a child safety seat configuration (i.e., as depicted in FIG. 1) to a high-back booster seat (depicted in FIG. 4(A)).

Figure 1A:
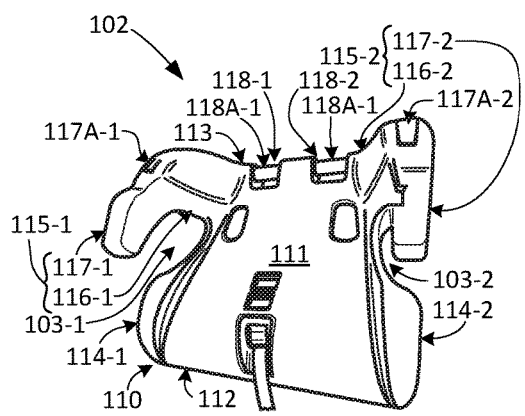
Figure 1B:
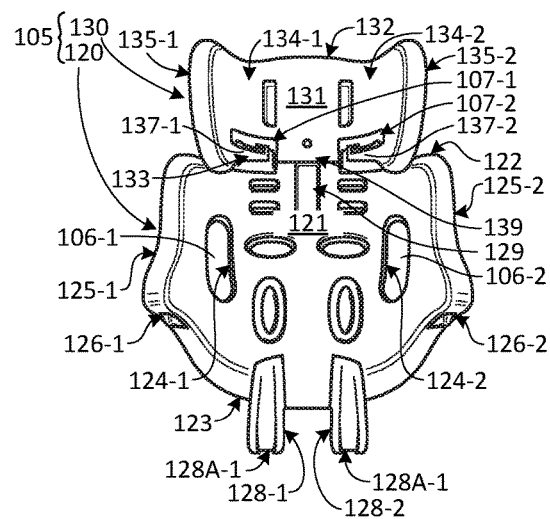

According to the exemplary embodiment, seat shell 101 includes a plastic-molded base 102 (shown in FIG. 1(A)) and a separate plastic-molded back/head support 105 (shown in FIG. 1(B)).

Referring to FIG. 1(A), base 102 is a rigid plastic molded structure formed according to known techniques, and generally includes a seat portion 110 and two belt-guide portions 115-1 and 115-2. Seat portion 110 includes an upper seat surface 111, a front edge 112, a back edge 113, and opposing side edges 114-1 and 114-2. Belt-guide portions 115-1 and 115-2 are integrally molded, rigid plastic structures respectively connected to side edges 114-1 and 114-2 of seat portion 110 adjacent to back edge 113. Belt-guide portions 115-1 and 115-2 respectively including generally-vertically-oriented armrest supports 116-1 and 116-2 extending upward from side edges 114-1 and 114-2, and generally horizontal armrests 117-1 and 117-2 respectively extending from upper ends of armrest supports 116-1 and 116-2 (i.e., toward front edge 112), whereby lap-belt guide slots 103-1 and 103-2 are respectively defined between side edges 114-1 and 114-2 and belt-guide portions 115-1 and 115-2, respectively. Optional openings and structures are molded into or integrally attached to base 102 to facilitate connecting lower sections of safety harness system 140 and to facilitate operable connection and orientation of base 102 to back/head support 105. For example, base 102 includes pivot-stop grooves 117A-1 and 117A-2 that are integrally formed on belt-guide portions 115-1 and 115-2, respectively (i.e., in this example on rear portions of armrests 117-1 and 117-2). In addition, base 102 includes attachment sockets 118-1 and 118-2 integrally molded into seat portion 102 adjacent back edge 113, where attachment sockets 118-1 and 118-2 respectively include engaging pins 118A-1 and 118A-2. The purpose and function of the attachment sockets and pivot-stop grooves is described below.

Referring to FIG. 1(B), back/head support 105 includes a backrest structure 120 and a headrest structure 130 that are adjustably coupled together as described below.

Backrest structure 120 includes a generally vertical backrest portion 121 having an upper edge 122, a lower edge 123, opposing backrest side edges 124-1 and 124-2, and two backrest flanges 125-1 and 125-2 respectively extending generally forward from backrest side edges 124-1 and 124-2, respectively. Safety belt-guide openings 106-1 and 106-2 are defined between flanges 125-1 and 125-2 and central backrest portion 121. Optional openings and structures are molded into or integrally attached to backrest structure 120 to facilitate operable connection of upper sections of safety harness system 140, to facilitate operable attachment of backrest structure 120 to base 102, and to facilitate adjustable connection of backrest structure 120 to headrest structure 130. For example, pivot-stop members 127-1 and 127-2 are integrally molded onto and extend from lower sections of flanges 125-1 and 125-2, respectively, and configured to fit within pivot-stop grooves 117A-1 and 117A-2 when seat assembly is fully-assembled and in a fully-upright position. In addition, backrest structure 120 includes attachment members 128-1 and 128-2 that extend downward from lower edge 123 and respectively include at free ends thereof engaging hooks 128A-1 and 128A-2 that operably connect into attachments sockets 118-1 and 118-2 when backrest 120 is operably coupled to base 102. Moreover, backrest structure 120 includes a headrest engagement flange 129 integrally molded to and extending from upper edge 122 of central backrest portion 121.

Headrest structure 130 includes a generally vertical headrest portion 131 having an upper edge 132, a lower edge 133, opposing headrest side edges 134-1 and 134-2, and two headrest flanges 135-1 and 135-2 respectively extending generally forward from headrest side edges 134-1 and 134-2, respectively. Optional openings and structures are molded into or integrally attached to headrest structure 130 to facilitate attachment of shoulder belts and operable attachment to backrest structure 120. For example, headrest structure 130 includes shoulder strap guide members 137-1 and 137-2 that respectively define shoulder strap-guide slots 107-1 and 107-2, and includes a backrest engagement flange 139 integrally molded to and extending downward from lower edge 133 of central headrest portion 131.

Figure 2A:
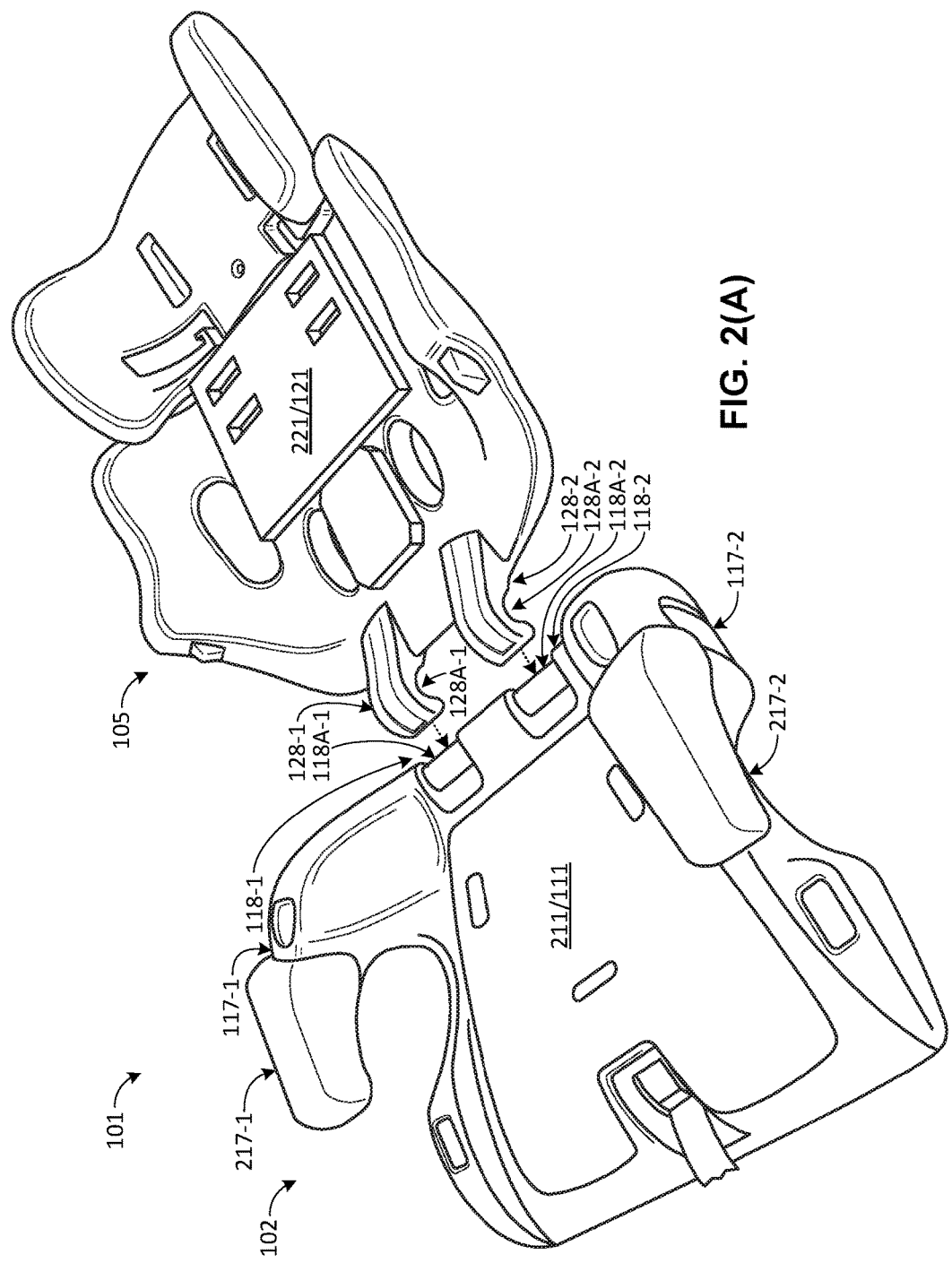

FIG. 2(A) shows seat shell 101 with base 102 and back/head support 105 in a disassembled state, and further shows optional cushions that are disposed under the plush cover to provide additional comfort and safety. In particular, a back cushion 221 is mounted and secured onto central backrest portion 121, a seat cushion 211 is mounted and secured onto upper seating surface 111, and armrest cushions 217-1 and 217-2 mounted and secured onto armrests 117-1 and 117-2, respectively.

FIGS. 2(A) and 2(C) also show an exemplary assembly process by which base 102 and back/head support 105 are operably connected together. As indicated in FIG. 2(A), with back/head support 105 in a fully reclined orientation relative to base 102 (i.e., such that central backrest portion 121 is aligned substantially parallel to upper seating surface 111), back/head support 105 is moved toward base 102 with attachment members 128-1 and 128-2 aligned with sockets 118-1 and 118-2, respectively. Note that, in this orientation, engaging hooks 128A-1 and 128A-2 are in an open-side-down orientation (i.e., such that positioning engaging hooks 128A-1 and 128A-2 over engaging pins 118A-1 and 118A-2 and pressing downward facilitates rotatable engagement of back/head support 105 to base 102). FIG. 2(B) shows seat shell 101 with base 102 and back/head support 105 operably rotatably engaged together in the fully reclined orientation with attachment members 128-1 and 128-2 engaged into sockets 118-1 and 118-2, respectively. Once this engagement is achieved, back/head support 105 is rotated upward relative to base 102 (i.e., in the inclining direction indicated by the curved dashed-line arrow I) such that pivot-stop members 127-1 and 127-2 disposed on flanges 125-1 and 125-2 move toward pivot-stop grooves 117A-1 and 117A-2 disposed on armrests 117-1 and 117-2, respectively (in alternative embodiments, portions of plush cover material may or may not be disposed between the pivot-stop structures). FIG. 2(C) shows seat shell 101 with back/head support 105 operably connected together in the fully upright orientation, which is achieved when the pivot-stop members disposed on backrest flanges 125-1 and 125-2 engage/abut corresponding pivot-stop grooves disposed on armrests 117A-1 and 117A-2, respectively. Note that in the fully-upright orientation the engaging hooks are secured inside the sockets (i.e., such that back/head support 105 cannot be pulled vertically upward away from base 102), and that subsequent disengagement of back/head support 105 from base 102 requires rotating back/head support 105 in the reclining direction indicated by the dashed-line arrow R in FIG. 2(C).

Figure 1C:
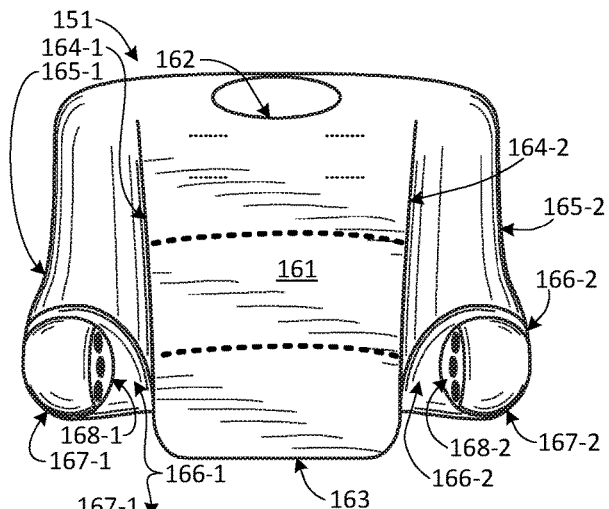
Figure 1D:
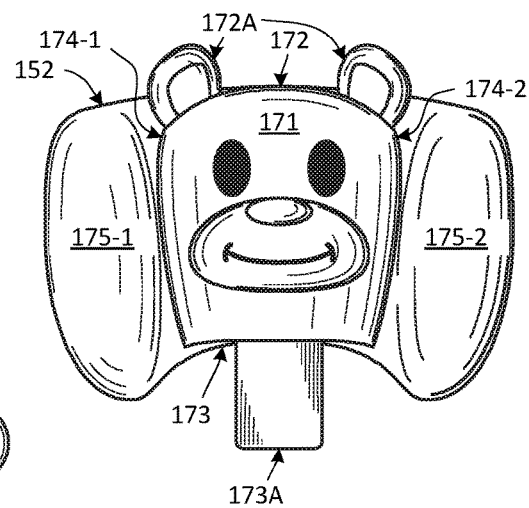
Figure 1E:
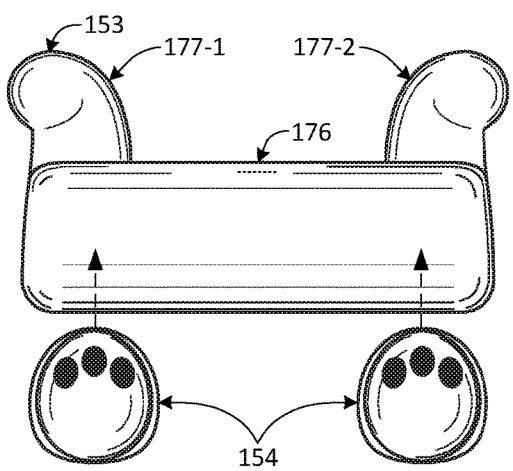
Figure 1F:
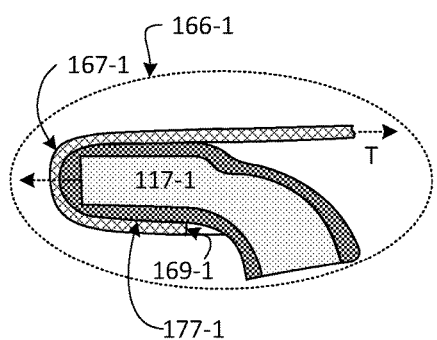

Referring to FIG. 1, plush cover 150 includes a backrest panel 151 (shown separately in FIG. 1(C)), a headrest panel 152 (shown separately in FIG. 1(D)), and a base panel 153 (shown separately in FIG. 1(E)). As indicated in FIG. 1 and below base panel 153 in FIG. 1(E), optional feet pillows 154 are detachably connected to base panel 153.

Referring to FIG. 1(C), backrest panel 151 includes a torso cover portion 160 configured to wrap securely around backrest structure 120 (see FIGS. 1 and 1(B)), with a central torso section 161 shaped and disposed to cover central backrest portion 121, flange cover sections 165-1 and 165-2 shaped and disposed to mount over backrest flanges 125-1 and 125-2, respectively, and tube-like armrest cover sections 166-1 and 166-2 that extend forward from opposite sides of torso section 161 (i.e., by way of connection to flange cover sections 165-1 and 165-2, respectively). Central torso section 161 includes a upper edge 162, a lower edge 163, and opposing side edges 164-1 and 164-2, and includes several slots and openings operably positioned to facilitate the mounting and use of harness system 140, and is secured onto central backrest portion 121 by way of one or more backside attachment structures 164 (indicated by dashed-lines to indicate they are disposed behind central backrest portion 121). Flange cover sections 165-1 and 165-2 are respectively integrally sewn or otherwise integrally connected to side edges 164-1 and 164-2, and are generally formed in the shape of animal shoulder features. Tube-like armrest cover sections 166-1 and 166-2 are respectively integrally sewn or otherwise integrally connected to flange cover sections 165-1 and 165-2, and respectively include padded closed free-ends 167-1 and 167-2 including inward inward-facing paw (extremity) features 168A-1 and 168A-2. Tube-like armrest cover sections 166-1 and 166-2 respectively define attachment openings that facilitate mounting over armrests 117-1 and 117-2 over armrest/belt-guide protrusions 115-1 and 115-2, respectively, when seat assembly 100 is operably assembled and configured in the manner described below, and are further configured to facilitate resisting subsequent rotation of back/head support 105 in a reclining direction. For example, as indicated by the section line near the center of FIG. 1 and associated FIG. 1(F), tube-like armrest cover section 166-1 defines attachment opening 169-1 that is configured to facilitate mounting tube-like armrest cover section 166-1 over armrest 117-1 such that paw feature 168A-1 faces inward. Note that subsequent rotation of the back/head support 105 in the reclining direction, which causes armrest 117-1 to exert force F on closed free end 167-1, is resisted in part by a tensile force T exerted along tube-like armrest cover section 166-1.

Referring to FIG. 1(D), headrest panel 152 is configured to wrap securely around headrest structure 130 (see FIG. 1(B)), and generally includes a central headrest cushion 171 shaped and disposed to cover central head support 131, headrest flange cushions 175-1 and 175-2 shaped and disposed to mount over headrest flanges 135-1 and 135-2, respectively. Central headrest cushion 171 is configured to depict a face of the featured character, and includes a upper edge 172, a lower edge 173, and opposing side edges 174-1 and 174-2, and includes optional additional character features such as ears 172A extending from upper edge 172. Flange cover sections 175-1 and 175-2 are respectively integrally sewn or otherwise integrally connected to side edges 174-1 and 174-2, and are preferably generated using a non-character color (e.g., yellow) to provide contrast that better displays the character's face/head. In one embodiment, headrest panel 152 further includes a depending neck section 173A that extends downward from lower edge 173 and, as indicted in FIG. 1, is trained under an upper edge 162 of the torso cover portion. This arrangement facilitates adjusting (raising/lowering) headrest structure 130 relative to backrest structure 120 without creating a gap between central headrest section 171 and central torso section 161.

Referring to FIG. 1(E), base cover panel 153 includes a central seat cover portion 176 and armrest cover sections 177-1 and 177-2 that extend upward from seat cover portion 176 and configured to fit tightly over armrests 117-1 and 117-2 of base 102. That is, base cover panel 153 is configured to conformally fit over all upper and side surfaces of base 102, but also provides openings that allow operably connection of back/head support 105 to base 102 in the manner described herein.

Figure 5A:
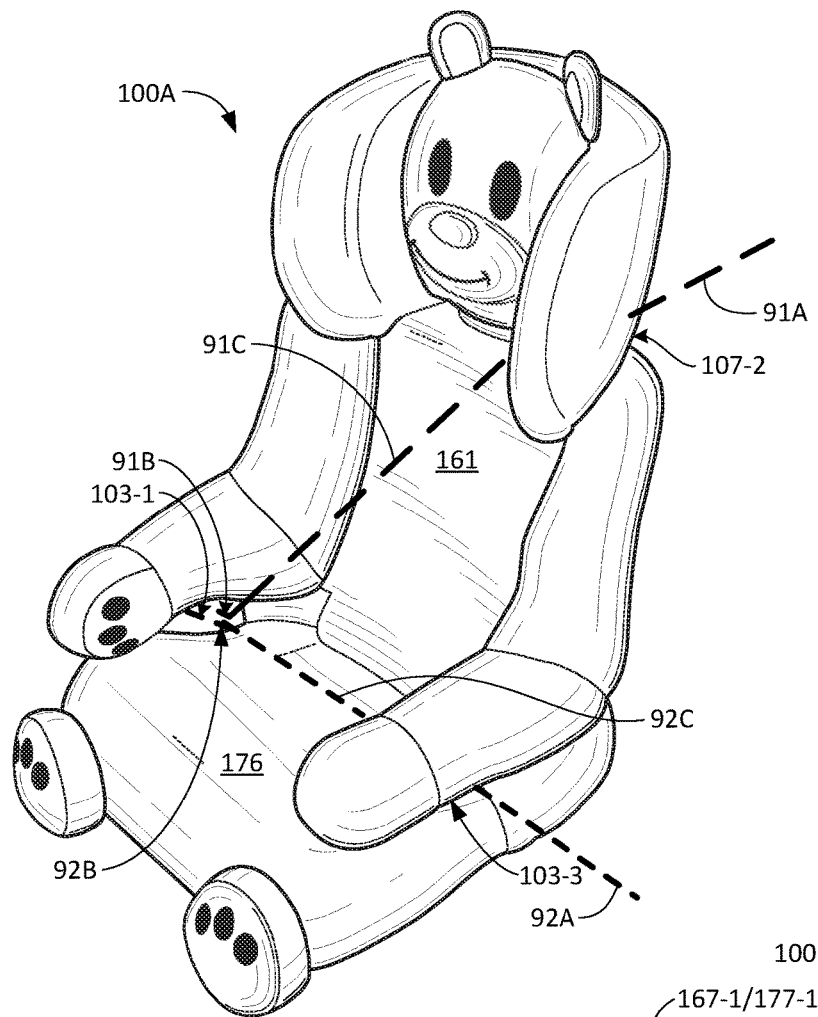
FIGS. 5(A) and 5(B) show the 3-in-1-type combination safety/booster seat of FIG. 1 in a high-back booster configuration and a no-back booster configuration, respectively.
Figure 5B:
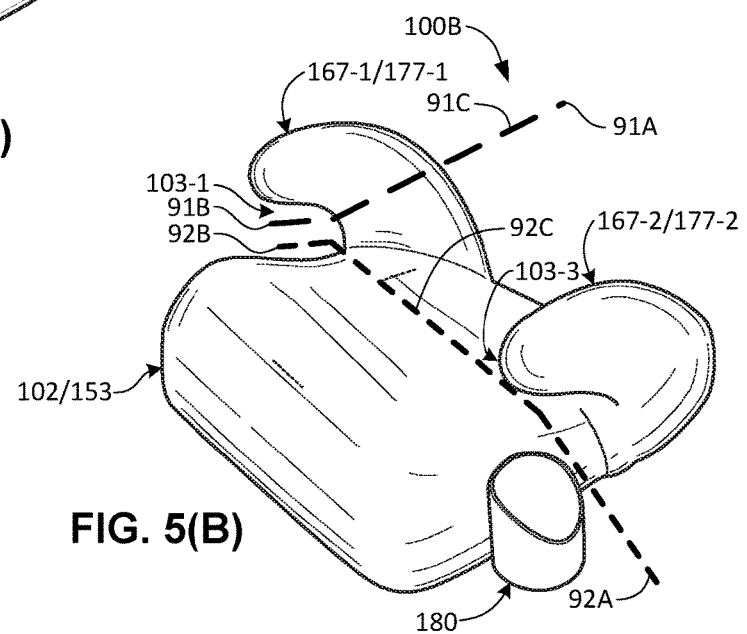

According to an aspect of the present invention, plush cover 150 is decoratively patterned (e.g., dyed, embellished or assembled from separately colored pieces) to depict an attractive character when seat assembly 100 is in the safety seat configuration depicted in FIG. 1, or in a high-back booster configuration (e.g., as depicted in FIG. 5(A)), whereby the character image serves to entice young children to enter and remain seated in seat assembly 100. In addition, plush cover 150 is configured such that all indicia related to the character is removed when seat assembly 100 is converted from a child safety seat to a no-back booster seat (e.g., as depicted in FIG. 5(B)). This configuration is implemented by way of disposing all character-based features onto backrest cover panel 151 and headrest cover panel 152, and forming base panel 153 with generic features. For example, base panel 153 is formed using the same base-colored (e.g., brown) fabric as backrest panel 151 and headrest panel 152, but is intentionally devoid of permanent features depicting recognizable parts of the character's lower body and legs).

Figure 3A:
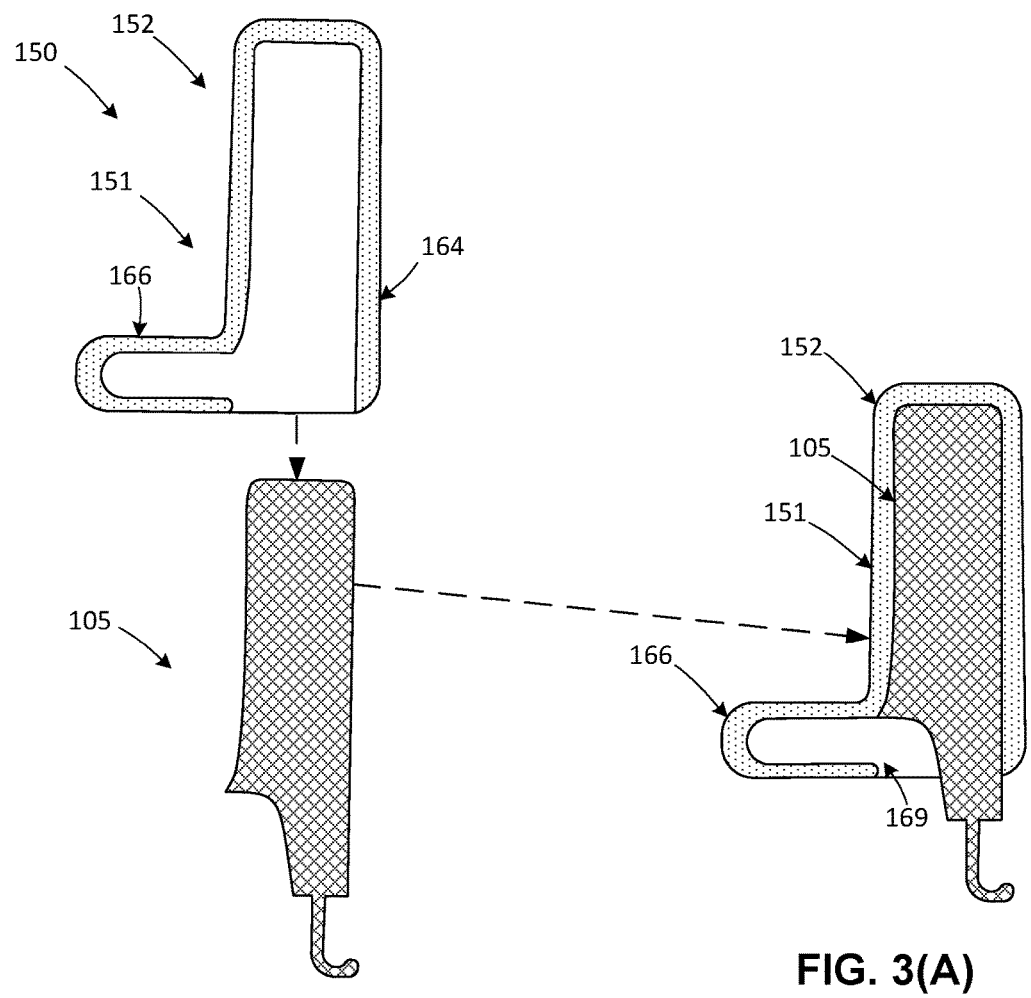
FIGS. 3(A), 3(B), 3(C) and 3(D) are simplified cross-sectional views showing an exemplary assembly process utilized according to an embodiment of the present invention.
Figure 3B:
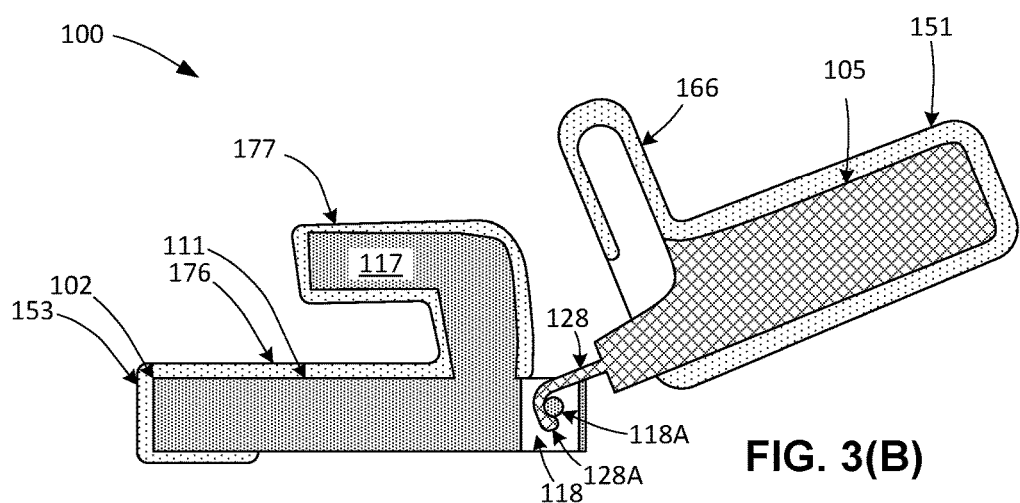
Figure 3C:
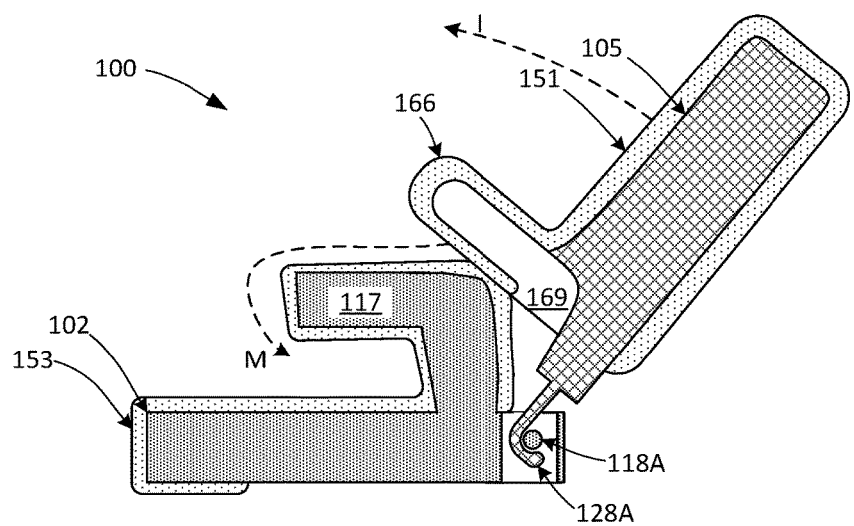

FIGS. 3(A) to 3(C) depict assembly plush cover 150 and subsequent connection of back/head support 105 to base 102 according to a simplified embodiment of the present invention. Because these figures show the seat assembly features from the side view, multiple structures/features are identified collectively (e.g., tube-like armrest cover sections 166-1 and 166-2 shown in FIG. 1(C) are indicated collectively as tube-like sections 166).

FIG. 3(A) depicts in a simplified manner the mounting of backrest panel 151 and headrest panel 152 of plush cover 150 onto back/head support 105. This figure indicates that portions of plush cover essentially entirely surround back/head support 105, with tube-like armrest cover sections 166 disposed on a frontside surface of back/head support 105, and backside attachment structure 164 disposed across a backside surface of back/head support 105. Referring to the right side of FIG. 3(A), when assembly is complete, attachment openings 169 are positioned to facilitate the mounting of tube-like armrest cover sections 166 as described below.

FIG. 3(B) depicts seat assembly 100 in a simplified manner, with base cover panel 153 already disposed on base 102 such that armrest cover sections 177 are disposed on armrests 117, and with back/head support 105 operably coupled to base 102 by way of engaging hooks 128A of attachment members 128 mounted over engaging pins 118A of engaging sockets 118 in the manner described above. Note that, with back/head support 105 in the reclined orientation required to operably attach back/head support 105 to base 102, tube-like armrest cover sections 166 are separated from armrests 117.

FIG. 3(C) depicts seat assembly 100 during a subsequent step while back/head support 105 rotated upward in the inclining direction I relative to base 102. Note that this rotation causes engaging hooks 128A to become secured onto engaging pins 118A such that disconnection can only be subsequently achieved by way of rotating back/head support 105 downward (opposite to inclining direction I)—that is, after assembly, inadvertent rotation of back/head support 105 in the reclining direction may result in undesirable or dangerous disconnection of one or more engaging hooks 128A from engaging pins 118A. Once back/head support 105 is rotated upward far enough relative to base 102, tube-like armrest cover sections 166 can be pulled forward and over armrests 117 (i.e., such that armrests 117 and armrest cover sections 177 pass through attachments opening 169 and into the voids respectively surrounded by tube-like armrest cover sections 166.

Figure 3D:
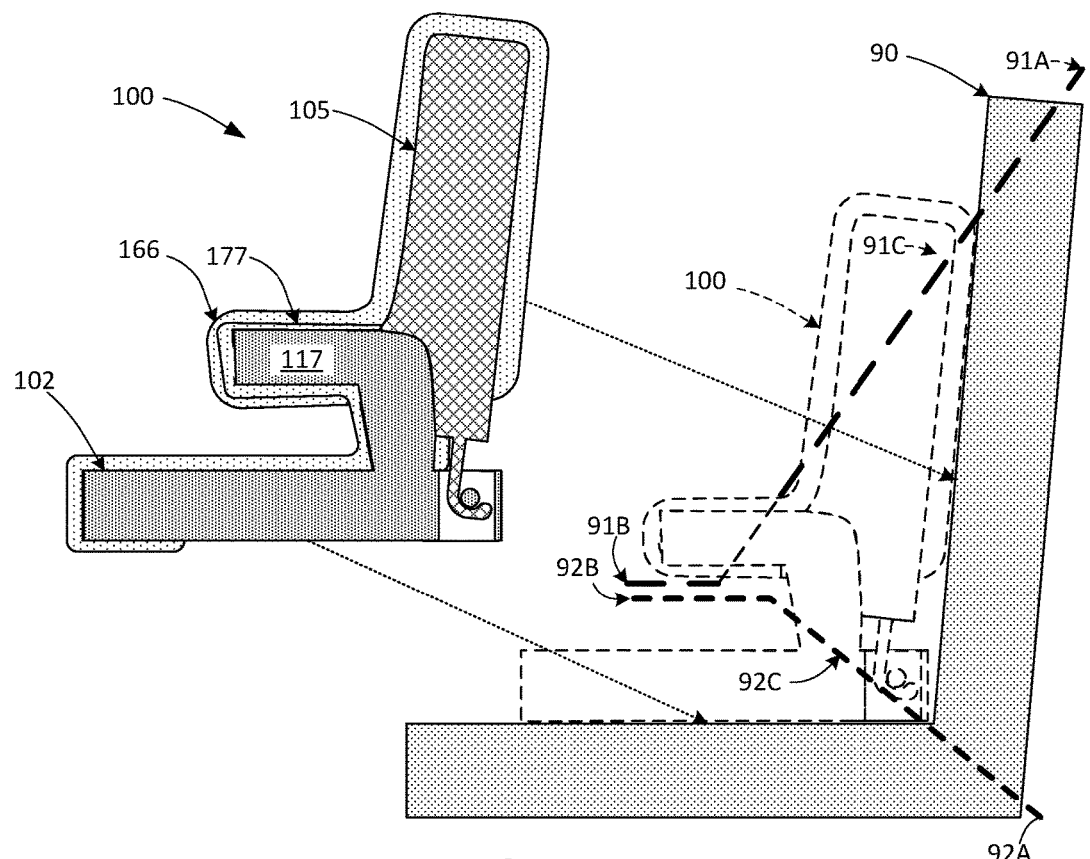

FIG. 3(D) shows seat assembly 100 in a fully assembled, fully-upright configuration during installation onto an automobile seat 90. Note that tube-like armrest cover 166 is now mounted onto armrest 117 by way of armrest cover section 177 (i.e., armrest cover section 177 is disposed between armrest 117 and armrest cover 166), which serves to resist rotation of back/head support 105 relative to base 102 as described below with reference to FIG. 4, and also serves to provide added cushion that provide comfort and safety for small children/passengers as the enter and are retained in seat assembly 100.

Figure 4:
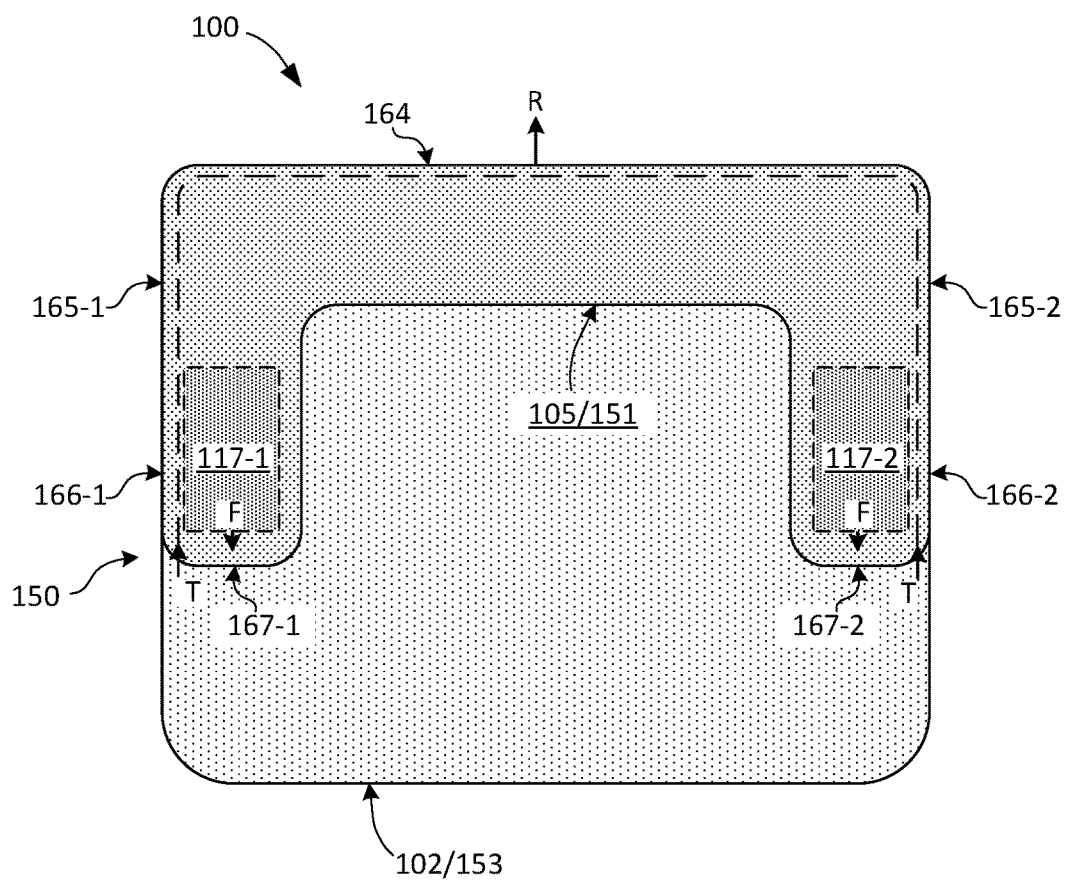
FIG. 4 is a simplified top view showing a tensile force generated by the seat assembly to resist rotation of the back/head support in a reclining direction relative to the base.

FIG. 4 is a simplified top view depicting the installation process of FIG. 3(D), and illustrates how plush cover 150 resists rotation of back/head support 105 relative to base 102 when tube-like armrest cover sections 166-1 and 166-2 are respectively mounted over armrests 117-1 and 117-2 while back/head support 105 is operably coupled to base 102 and in a fully upright position. During installation, if back/head support 105 is biased in a reclining direction R relative to base 102, armrests 117-1 and 117-2 exert pressing forces F on closed free ends 167-1 and 167-2 of tube-like armrest cover sections 166-1 and 166-2, respectively. Plush cover 150 resists this reclining bias by way of a continuous (rope-like) fabric structure extending from closed free ends 167-1 and 167-2 along armrest cover sections 166-1 and 166-2 and flange cover sections 165-1 and 165-2, and connected by backside attachment structure 164. Specifically, when pressing forces F are exerted by armrests 117-1 and 117-2, the continuous fabric structure provided by backrest panel 151 of plush cover 150 resists these forces by pulling taut and exerting a tensile counter-force T (indicated by the long-section dashed line) that resists forward movement of armrests 117-1 and 117-2. As such, the engaging hooks remain securely connected in the sockets as described above, and separation of back/head support 105 from base 102 is prevented.

Referring again to FIG. 3(D), once seat assembly 100 is mounted on automobile seat 90, the automobile safety restraint (seatbelt) system is utilized to secure seat assembly 100 to seat 90 in the manner described below. For illustrative purposes, the seatbelt system is depicted and referenced by way of a shoulder belt anchor point 91A, a central shoulder belt section 91C, and a buckle end portion 91B, a lap belt anchor point 92A, a central lap belt portion 92C, and a buckle end portion 92B. Other details and structures associated with automobile safety restraint systems are well known and thus these details are omitted for brevity.

FIGS. 5(A) and 5(B) are perspective views respectively showing a seat assembly 100A in a high-back booster configuration, and a seat assembly 100B in a no-back booster configuration. Both seat assembly 100A and seat assembly 100B include components that are identical to seat assembly 100 shown in FIG. 1, but in each case at least one component is removed during reconfiguration. For example, seat assembly 100 of FIG. 1 is reconfigured into the high-back booster configuration depicted by seat assembly 100A (FIG. 5(A)) by way of removing the safety harness system 140 shown in FIG. 1. Similarly, seat assembly 100 of FIG. 1 is reconfigured into the no-back booster configuration depicted by seat assembly 100B (FIG. 5(B)) by way of detaching and removing back/head support 105 from base 102 using a reverse of the assembly operation described above, and removing feet pillows 154. Note that an optional cup holder 180 is shown in FIG. 5(B), and is attached by way of a slide structure inserted into a corresponding slot defined in base 102 by way of a slit provided in base cover panel 153. This optional cup holder arrangement is also supported on the opposite side surface, and may further be utilized in conjunction with the safety seat and high-back booster configurations.

The various belt-guide structures and harness features of seat assembly 100 facilitate safe and compliant retention of a child/passenger in each of the three different configurations depicted in FIGS. 1, 5(A) and 5(B). In the child safety seat configuration (FIG. 1), the automobile safety belt system (e.g., shoulder belts 91 and lap belt 92, which are shown in FIG. 3(D)) are passed through safety belt-guide openings 106-1 and 106-2 (i.e., formed on backrest panel 120, as shown in FIG. 1(B)) to secure seat assembly 100 to the automobile seat (e.g., seat 90 in FIG. 3(D)), and the child is then secured to seat assembly 100 by way of safety harness 140 (shown in FIG. 1). In the high-back booster configuration shown in FIG. 5(A), the upper portion of automobile shoulder belt 91 (i.e., adjacent to anchored end 91A) is passed through one of the two shoulder strap-guide slots (e.g., slot 107-1), the central portion 91C is passed in front of central backrest cover panel portion 161, and the buckle-end portion 91B is passed through one of the lap-belt guide slots (e.g., slot 103-1), with central lap belt section 92C trained over seat cover portion 176 (i.e., extending from anchored end 92A through lap-belt guide slot 103-2, and with buckle end portion 92B extending through lap-belt guide slot 103-1). Similarly, in the no-back booster configuration shown in FIG. 5(B), central lap belt section 92C is trained between lap-belt guide slots 103-1 and 103-2 over seat cover portion 176 between anchored end 92A and buckle end portion 92B, and central shoulder belt portion 91C is trained across a child/passenger (not shown) between anchored end 91A and buckle end 91B, which also passes through lap-belt guide slot 103-1.

Referring again to FIGS. 1, 5(A) and 5(B), note that all character-based features (i.e., other than feet pillows 154) are disposed on backrest cover panel 151 and headrest cover panel 152, whereby all references to the character are separated from the base when the seat assembly is configured in the no-back booster configuration. Accordingly, the character references are present while a child/passenger is young and small (i.e., when existing safety laws require the use of either a child safety seat or high-back booster seat), and therefore while a child is either attracted to or ambivalent about the character features. In contrast, when the child/passenger is older/larger but still required by existing safety laws to use a no-back booster seat, all references to the character are removed to avoid anxiety or embarrassment that might cause the older child to resist entering or try separating from the no-back booster, which can cause inconvenience and/or safety issues. Accordingly, the character-based 3-in-1-type combination seat assembly of the present invention combines the cost efficiencies of conventional 3-in-1-type combination seats with the safety and appeal of character-based seats, while avoiding issues associated with retaining character references when a child/passenger outgrows the appeal of the depicted character.

Although the present invention has been described with respect to certain specific embodiments, it will be clear to those skilled in the art that the inventive features of the present invention are applicable to other embodiments as well, all of which are intended to fall within the scope of the present invention. For example, although a bear-type character is utilized in the exemplary embodiment, other types of animals (e.g., dogs, monkeys, etc.), cartoon characters or even humans may be depicted on the backrest panel and headrest panel of the plush cover without departing from the spirit and scope of the present invention. In addition, although the present invention is described with reference to plastic-molded base and backrest structures that are detachably connected by way of engaging hooks and associated sockets, the present invention is not intended to be limited to such detachable arrangements unless specified in the appended claims. Moreover, although the exemplary embodiment utilizes a two-part back/head support that facilitates vertical adjustment of the headrest structure relative to the backrest structure, a integrally molded head/back support may also be utilized in some embodiments (note that, in such embodiments, the headrest panel and backrest panel of the plush cover may be sewn/integrated into a single piece). Further, although the backrest panel of the plush cover is described as being attached to the backrest structure by way of a band-like backside attachment structure, the backside attachment structure may be implemented using other structures, such as a continuous fabric sheet, a web or a mesh extending across some/all of the backside surface of the backrest structure.

The invention claimed is:

1. A combination safety/booster seat assembly for securing a child to a vehicle seat, the assembly including:
　a base structure including:
　　a seat portion having opposing front and back edges and opposing first and second seat side edges, and
　　first and second belt-guide portions rigidly connected to the seat portion adjacent to the back edge, the first and second belt-guide portions respectively including first and second armrest supports extending upward from the first and second seat side edges, and first and second armrests respectively extending from upper ends of the first and second armrest supports toward the front edge of the seat portion, whereby first and second lap-belt guide slots are respectively defined between said first and second seat side edges and said first and second belt-guide portions, respectively;
　a back/head support including a backrest portion having an upper edge, a lower edge, opposing backrest side edges, and first and second backrest flanges respectively extending generally forward from the backrest side edges; and
　a plush cover comprising:
　　a torso cover portion including a central torso section disposed over said central backrest portion and fixedly attached to said back/head support by way of a backside attachment structure;
　　first and second flange cover sections integrally sewn to the torso cover portion and respectively disposed over the first and second backrest flanges; and
　　first and second armrest cover sections integrally sewn to the flange cover sections and respectively having first and second closed free ends, said first and second armrest cover sections defining attachment openings configured to respectively receive therein said first and second armrests when the back/head support is operably disposed in a fully upright position relative to the base structure, whereby when said first and second armrest cover sections are mounted over said first and second armrests and said back/head support is biased in a reclining direction relative to said base structure such that said first and second armrests exert pressing forces on said first and second closed free ends of said first and second armrest cover sections, said plush cover resists said bias in the reclining direction by way of a tensile force extending from said first and second closed free ends along said first and second armrest cover sections, said first and second flange cover sections and said backside attachment structure.

2. A character-based combination safety/booster seat assembly for securing a child to a vehicle seat, the assembly comprising:

a base structure including a seat portion having opposing seat side edges and first and second armrests rigidly attached to the seat side edges;

a backrest structure detachably coupled at a lower edge to the base structure;

a headrest structure adjustably coupled to an upper edge the backrest structure; and a plush-fabric cover including:

a backrest panel including a torso cover portion disposed over and fixedly connected to the backrest structure and including first features depicting a torso of a character, a headrest panel fixedly attached to the headrest structure and including a central headrest cushion including second features depicting a face of the character, and a depending neck section extending downward from the central headrest cushion and under an upper edge of the torso cover portion; and a base panel including a seat cover portion disposed over the seat portion and first and second armrest cover sections extending from the seat cover portion over the first and second armrests, respectively, wherein said seat panel includes generic features, wherein the backrest panel includes integrally sewn first and second armrest cover sections extending from the torso cover portion, each said first and second armrest cover section including a third feature depicting an extremity of said character, and wherein backrest panel is configured such that, when the backrest structure is operably disposed in a fully upright position relative to the base structure, said first and second armrest cover sections are removably mountable onto said first and second armrests by way of inserting said first and second armrest cover sections through corresponding attachment openings defined in said first and second armrest cover sections.

3. A character-based combination safety/booster seat assembly for securing a child to a vehicle seat, the assembly comprising:

a base including a seat portion and first and second belt-guide portions, said seat portion having opposing front and back edges and opposing first and second seat side edges, and including one or more attachment sockets disposed adjacent to the back edge, said first and second belt-guide portions being integrally connected to the seat portion adjacent to the back edge and respectively including first and second armrest supports and first and second armrests respectively extending from upper ends of the first and second armrest supports;

a back/head support including a backrest structure and a headrest structure that is adjustably coupled to an upper edge of the backrest structure, the backrest structure having a central backrest portion, first and second backrest flanges respectively extending generally forward from side edges of the central backrest portion, and one or more engaging hooks extending from a lower edge of the central backrest portion, and the headrest structure having central headrest portion, first and second headrest flanges respectively extending generally forward from side edges of the central headrest portion, and first and second shoulder strap guide members disposed adjacent a lower edge of the central backrest portion; and a plush-fabric cover including:

a backrest panel fixedly connected to the backrest structure by way of a backside attachment structure extending across a back surface of said backrest structure, said backrest panel including first and second flange cover sections respectively disposed over the first and second backrest flanges such that said first and second flange cover sections generally resemble the shoulders and upper arms of a character, and first and second armrest cover sections that are attached to and extend from the first and second flange cover sections portion, respectively, a headrest panel fixedly attached to the headrest structure and including a central head cushion disposed over the central headrest portion and configured to resemble a face of the character; and a seat panel including a seat cover portion disposed over the seat portion and armrest cover sections extending from the seat cover portion over the armrests of the base structure, said seat panel including generic features, wherein the first and second armrest cover sections include closed free ends configured to depict lower arms of said character, and wherein the first and second armrest cover sections are operably attached by way of the first and second the flange cover sections to said backside attachment structure and respectively define attachment openings configured to respectively receive therein said first and second armrests when said one or more engaging hooks are operably engaged in said one or more attachment sockets and said back/head support is in a fully upright position relative to the base structure, whereby rotation of the back/head support into a reclining direction is resisted by a tensile force generated along said first and second armrest cover sections, said first and second backrest flange cover sections and said backside attachment structure.

* * * * *